United States Patent
Hassick (12)

(10) Patent No.: US 6,184,257 B1
(45) Date of Patent: Feb. 6, 2001

(54) COMPOSITION OF FERRIC CHLORIDE AND A DIALKYL DIALLYL AMMONIUM POLYMER AND PROCESS OF PREPARING THE SAME

(75) Inventor: Denis E. Hassick, Monroeville, PA (US)

(73) Assignee: Calgon Corporation, Naperville, IL (US)

( * ) Notice: Under 35 U.S.C. 154(b), the term of this patent shall be extended for 0 days.

(21) Appl. No.: 09/545,755

(22) Filed: Apr. 10, 2000

(51) Int. Cl.⁷ .................. A61K 47/00; A61K 47/30; C02F 1/52
(52) U.S. Cl. ................... 514/769; 514/772.3; 210/728
(58) Field of Search .................. 210/728; 514/769, 514/772.3

(56) References Cited

U.S. PATENT DOCUMENTS 5,035,808 * 7/1991 Hassick et al. ............ 210/728

* cited by examiner

Primary Examiner—Raymond Henley, III
(74) Attorney, Agent, or Firm—Walter C. Danison; Thomas M. Breininger

(57) ABSTRACT

The present invention provides a novel formulation in a composition comprising $FeCl_3$ and a dialkyl diallyl ammonium polymer where the $FeCl_3$ has been diluted with water prior to being mixed with the polymer providing a stable composition.

19 Claims, No Drawings

COMPOSITION OF FERRIC CHLORIDE AND A DIALKYL DIALLYL AMMONIUM POLYMER AND PROCESS OF PREPARING THE SAME

BACKGROUND OF THE INVENTION

The use of various coagulants for the flocculation of suspended solids from aqueous solutions is well known in the art. Many coagulants are known including alum, aluminum sulfate, ferric chloride, ferric sulfate and lime. Commonly used polyelectrolytes for this purpose include polydimethyl (p-DMDAAC) and Epi-DMA polyamine.

Blends of the inorganic coagulants with polyelectrolytes are known in the art. These blends combine the desirable properties of each component in the system to be treated without the need of feeding two separate additives at different points in the system. This presents a cost advantage in many circumstances and greatly simplifies treatment for many systems.

U.S. Pat. No. 5,035,808, the disclosure of which is incorporated herein in its entirety by reference, teaches the blending of commercial grade solutions of ferric salts and cationic polymers. Commercial grade ferric sulfate solution can be blended with either polyamine or p-DMDAAC to form stable products. However, it was not possible to prepare a viable product by blending commercial grade ferric chloride solutions (38–42 wt % active raw material) with p-DMDAAC. Such a blend was not possible because a gel would be formed immediately upon mixing. This problem is noted in column 3, lines 3–6 of U.S. Pat. No. 5,035,808. Instead, it was only possible to blend commercial grade ferric chloride solutions with polyamine.

Each group of polyelectrolyte has its own set of unique properties that it brings to the blend of polymer and inorganic coagulant. It would be very desirable to be able to combine the benefits of ferric chloride with those of p-DMDAAC in a composition that could be added as a single component to treat water systems.

SUMMARY OF THE INVENTION

The composition according to the present invention comprises $FeCl_3$ and a dialkyl diallyl ammonium polymer, where the $FeCl_3$ has been diluted with water prior being mixed with the polymer.

The process according to the present invention for the production of a composition comprises the dilution of a $FeCl_3$ solution with water and the subsequent addition of a dialkyl diallyl ammonium polymer.

This process results in a stable blend of $FeCl_3$ and the dialkyl diallyl ammonium polymer which resulting composition may be utilized as an effective coagulant for various applications.

DETAILED DESCRIPTION OF THE INVENTION

A method has been discovered by the inventor to combine $FeCl_3$ and a dialkyl diallyl ammonium polymer to make a stable blend. This method consists of diluting an $FeCl_3$ solution with water prior to mixing with the a dialkyl diallyl ammonium polymer. The inventor has unexpectedly discovered that if the $FeCl_3$ is dilute prior to the addition of dialkyl diallyl ammonium polymer, a stable blend of the two components is possible. This is a dramatic discovery and permits the addition of a single component to a system that normally required the addition of two separate additives at two separate points for an effective treatment of the system's water.

The $FeCl_3$ is preferably present in the composition of the present invention in a concentration of about 0.5% to about 20% by weight active $FeCl_3$, more preferably about 5%; to about 16% by weight. Blends with concentrations of $FeCl_3$ much above 20% by weight are not stable and gel, whereas dilute blends as low as 0.5% by weight and below do not have enough $FeCl_3$ to cause a significant effect in the water system to be treated.

If the dialkyl diallyl ammonium polymer is diluted first and then blended with the ferric chloride, stirring must be constant or the material gels. Thus, this method of preparation is less preferred. Additionally, the inventor has unexpectedly discovered that this gel, as well as the gel formed when the neat (undiluted) components are blended, can be reconstituted by dilution and agitation. However, the resulting product is not as clear and clean as when the $FeCl_3$ is diluted first and then blended with the dialkyl diallyl ammonium polymer.

The present invention relates to a novel composition and process of preparation wherein a commercial grade ferric chloride ($FeCl_3$) solution can be blended with a dialkyl diallyl ammonium polymer by diluting the ferric chloride prior to addition of the dialkyl diallyl ammonium polymer. This commercial grade ferric chloride ($FeCl_3$) solution is preferably diluted approximately 1:1 with water, and then such diluted composition is combined with the dialkyl diallyl ammonium polymer.

The dialkyl diallyl ammonium polymer is preferably a water-soluble $C_1$–$C_8$ dialkyl diallyl ammonium polymer. This $C_1$–$C_8$ dialkyl diallyl ammonium polymer is more preferably selected from the group consisting of polydimethyl diallyl ammonium chloride, polydiethyl ammonium chloride, polydiethyl diallyl ammonium chloride, polydimethyl diallyl ammonium bromide, and polydiethyl diallyl ammonium bromide. The most preferred water-soluble $C_1$–$C_8$ dialkyl diallyl ammonium polymer is polydimethyl diallyl ammonium chloride (polyDMDAAC or p-DMDAAC).

For the purpose of this description, the commercial grade ferric chloride is a $FeCl_3$ solution generally contains 38–42 wt % active raw material. Similarly, the dialkyl diallyl ammonium polymer is preferably p-DMDAAC and is a 40 wt % solution. One skilled in the art will understand that the ratios of these two compounds set forth below are specific to these concentrations. However, the process of this invention is easily applicable to compounds of varying concentrations if the ratios are modified accordingly.

Utilizing these concentrations, the most preferred ratios (in parts per volume) of $FeCl_3$ solution, water and p-DMDAAC are 10 $FeCl_3$, 10 $H_2O$ and 5 p-DMDAAC. When this ratio is utilized, a solution is immediately formed which remains stable for months.

When the ratios of 10 $FeCl_3$ and 5 p-DMDAAC are utilized, a volume of water less that ten parts can be used to obtain a relatively stable blend. However, a volume of water less that 7.5 parts should not be used. At 7.5 parts, the resultant mixture immediately thickens and is hazy. This mixture is somewhat stable over time, it precipitates, but it never quite solidifies. It is thus more preferred that the volume of water be greater than 7.5 parts and as close to a 1:1 ratio with the $FeCl_3$ solution as possible.

At the above noted concentrations of each component, the most preferred combination, in parts by volume, is 10 $FeCl_3$, 10 $H_2O$ and 5 p-DMDAAC. The preferred process for preparing the claimed composition is to add the 10 parts deionized water to the 10 parts $FeCl_3$ solution (a 1:1 ratio), while mixing, in order to dilute the $FeCl_3$ solution. Following the water, 5 parts p-DMDAAC should be added to the mixture while stirring. A clear solution will result which does not exhibit precipitation.

The resulting composition is an excellent coagulant for use in many applications including general wastewater, municipal wastewater, wastewater containing metals, papermaking wastewater, water containing chemical compounds, water containing biological compounds, poultry processing waste, ink containing solutions, raw surface water, oil/water mixtures, colored solutions, coal waste, oily waste, water with suspended solids, raw municipal drinking water, electrolytic primer coating wastewater and industrial wastewater.

What is claimed is:

1. A composition comprising $FeCl_3$ and a dialkyl diallyl ammonium polymer, where the $FeCl_3$ has been diluted with water prior being mixed with the polymer.

2. The composition of claim 1 wherein the $FeCl_3$ is present in the composition in a concentration of about 0.5 to about 20% by weight active $FeCl_3$.

3. The composition of claim 1 wherein the $FeCl_3$ is a solution containing 38 to 42 percent active raw material and is diluted with water in a ratio of 7.5 parts by volume or more water to 10 parts by volume $FeCl_3$ solution.

4. The composition of claim 3 wherein the ratio of parts of water to parts of $FeCl_3$ solution by volume is one to one.

5. The composition of claim 1 wherein:
   a. the $FeCl_3$ is a solution containing 38 to 42 percent active raw material and is 10 parts by volume of the composition;
   b. the water is 10 parts by volume of the composition; and
   c. the dialkyl diallyl ammonium polymer is of 40% weight percent and is 5 parts by volume of the composition.

6. The composition of claim 1 wherein the dialkyl diallyl ammonium polymer is a water-soluble $C_1$–$C_8$ dialkyl diallyl ammonium polymer.

7. The composition of claim 6 wherein the water-soluble $C_1$–$C_8$ dialkyl diallyl ammonium polymer is selected from the group consisting of polydimethyl diallyl ammonium chloride, polydiethyl ammonium chloride, polydiethyl diallyl ammonium chloride, polydimethyl diallyl ammonium bromide, and polydiethyl diallyl ammonium bromide.

8. The composition of claim 7 wherein the water-soluble $C_1$–$C_8$ dialkyl diallyl ammonium polymer is polydimethyl diallyl ammonium chloride (polyDMDAAC).

9. A process for the production of a composition comprising the dilution of a $FeCl_3$ solution with water and the subsequent addition of a dialkyl diallyl ammonium polymer.

10. The process of claim 9 wherein the $FeCl_3$ is present in the final composition in a concentration of about 0.5 to about 20% by weight active $FeCl_3$.

11. The process of claim 9 wherein the $FeCl_3$ solution contains 38 to 42 percent active raw material and is diluted with water in a ratio of 10 to 7.5 parts by volume.

12. The process of claim 11 wherein the ratio of parts of water to parts of $FeCl_3$ solution by volume is one to one.

13. The process of claim 9 wherein:
   a. the $FeCl_3$ is a solution containing 38 to 42 percent active raw material and is 10 parts by volume of the composition;
   b. the water is 10 parts by volume of the composition; and
   c. the a dialkyl diallyl ammonium polymer is of 40% weight percent and is 5 parts by volume of the composition.

14. The process of claim 9 wherein the dialkyl diallyl ammonium polymer is a water-soluble $C_1$–$C_8$ dialkyl diallyl ammonium polymer.

15. The process of claim 14 wherein the water-soluble $C_1$–$C_8$ dialkyl diallyl ammonium polymer is selected from the group consisting of polydimethyl diallyl ammonium chloride, polydiethyl ammonium chloride, polydiethyl diallyl ammonium chloride, polydimethyl diallyl ammonium bromide, and polydiethyl diallyl ammonium bromide.

16. The process of claim 15 wherein the water-soluble $C_3$–$C_8$ dialkyl diallyl ammonium polymer is polydimethyl diallyl ammonium chloride (polyDMDAAC).

17. A composition of matter comprising the product produced according to the process of claim 9.

18. A process for treating a solution comprising contacting the solution with an effective amount of the composition of claim 1.

19. A process for treating a solution comprising contacting the solution with an effective amount of the product produced according to the process of claim 9.

* * * * *